Figures 1, 2:
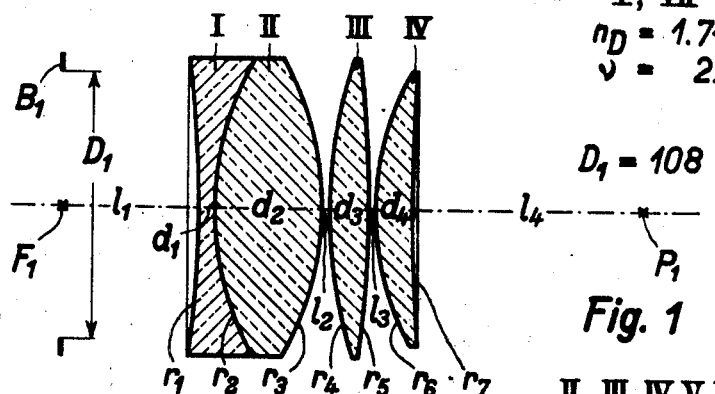

July 2, 1940.  A. KÖNIG  2,206,195

TELESCOPE EYEPIECE

Filed Dec. 14, 1938    2 Sheets-Sheet 1

I, VII
$n_D = 1.7174$
$\nu = 29.5$ $D_1 = 108$

II, III, IV, V, VI, VIII
$n_D = 1.5163$
$\nu = 64.0$ $D_2 = 115$

| | |
|---|---|
| $l_1 = 55.0$ | $r_1 = -472$ |
| $d_1 = 6.7$ | $r_2 = +120$ |
| $d_2 = 43.3$ | $r_3 = -120$ |
| $l_2 = 1.4$ | $r_4 = +190$ |
| $d_3 = 16.7$ | $r_5 = -447$ |
| $l_3 = 1.4$ | $r_6 = +112$ |
| $d_4 = 16.7$ | $r_7 = +1000$ |
| $l_4 = 92.0$ | |
| $l_5 = 68.0$ | $r_8 = -740$ |
| $d_5 = 30.0$ | $r_9 = -140$ |
| $l_6 = 0.6$ | $r_{10} = +183$ |
| $d_6 = 40.0$ | $r_{11} = -114$ |
| $d_7 = 6.7$ | $r_{12} = -1450$ |
| $l_7 = 0.6$ | $r_{13} = +101$ |
| $d_8 = 23.0$ | $r_{14} = \infty$ |
| $l_8 = 67.0$ | |

Inventor:

Albert König $D_3 = 125$

|  | IX, XI, XII, XIV | X | XIII |
|---|---|---|---|
| $n_D =$ | 1.5163 | 1.6477 | 1.7174 |
| $\nu =$ | 64.0 | 33.9 | 29.5 |

$l_9 = 20.0$
$d_9 = 37.9$
$d_{10} = 6.3$
$d_{11} = 52.0$
$l_{10} = 0.6$
$d_{12} = 36.3$
$d_{13} = 6.3$
$l_{11} = 0.6$
$d_{14} = 22.2$
$l_{12} = 69.0$ $r_{15} = + 367$
$r_{16} = - 121.5$
$r_{17} = + 121.5$
$r_{18} = - 151$
$r_{19} = + 200$
$r_{20} = - 174$
$r_{21} = - 326$
$r_{22} = + 93$
$r_{23} = + 460$

Inventor:
Albert König

Patented July 2, 1940

2,206,195

UNITED STATES PATENT OFFICE 2,206,195

TELESCOPE EYEPIECE

Albert König, Jena, Germany, assignor to the firm of Carl Zeiss, Jena, Germany

Application December 14, 1938, Serial No. 245,657
In Germany December 24, 1937

8 Claims. (Cl. 88—57)

The present invention concerns a telescope eyepiece comprising three convergent elements axially spaced by air, in which the sum of the distances apart of the elements amounts to at most one-third of the focal length of the eyepiece, and in which the rear element, i. e., the element facing the eye, is a single lens and in which the medial element contains at most one layer of cement, the front, i. e., object side, lens of this medial element and that lens of the front element which lies next thereto being convergent, and at least one surface of one of these two lenses being a cemented surface. When the convergent refractive powers are produced predominantly by the parts near the eye and in particular by the eye-lens, an eyepiece of the said kind has, as is often desired, the property that the distance apart of the exit pupil and the rear surface of the eye-lens is comparatively great as compared to the total focal length of the eyepiece.

When the curvature of the rear surface of the eye-lens is within the said limits, the demands on the correction of the image outside the optical axis can be arrived at if, according to the invention, the rear surface of the rear element has a curvature the magnitude of which lies between the refractive power of this lens and the negative value of this power, and if, further, at least eleven-twentieths of the algebraic sum of the refractive powers of the cemented surfaces of the said convergent lenses of the medial element and the front element are produced by one of these cemented surfaces, and if the numerical value of this sum is greater than one-twelfth of the sum of the numerical values of the curvatures of those surfaces of the said two lenses which face each other. By refractive power of a cemented surface is to be understood the quotient of the difference of the refractive indices of the lenses cemented to each other, divided by the radius of curvature of the cemented surface. This refractive power is positive with a convergent and negative with a divergent cemented surface.

To obtain an especially great distance apart of the exit pupil and the eye-lens, it is further advantageous to provide that the rear surface of the medial element of the eyepiece is convex toward the eye and has a refractive power amounting conveniently to at most half the refractive power of this element, and that the medial element of the eyepiece is a single lens. The correction of the image outside the optical axis, especially for coma, is facilitated by using as a front element three cemented lenses the medial lens of which is preferably divergent. On the other hand, a simple construction of the eyepiece having an especially good correction of the astigmatism of oblique pencils can be arrived at when the front element is a single lens whose front surface has a refractive power which is suitably at most one-quarter of that of the entire eyepiece.

Figure 3:
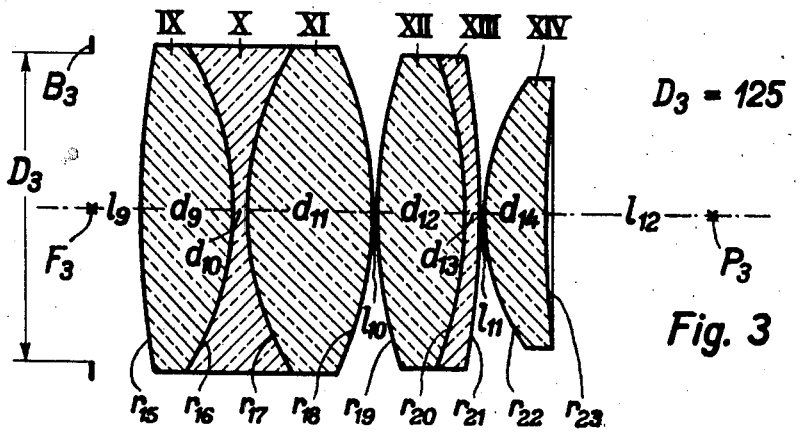

The Figures 1, 2 and 3 of the accompanying drawings illustrate schematically on a reduced scale three constructional examples of the invention in elevational sections. In each of these three examples, the focal length amounts to 100 units of measurement.

The first example (Figure 1) comprises a front element consisting of two cemented lenses I and II, a medial element constituting a single lens III, and a rear element constituting a single lens IV. In the second constructional example (Figure 2), the front element is a single lens V, the medial element consists of two cemented lenses VI and VII, and the rear element is a single lens VIII. The front element of the third constructional example (Figure 3) consists of three cemented lenses IX, X and XI, the medial element of two lenses XII and XIII, and the rear element is a single lens XIV. The front focal planes of the three constructional examples are indicated by the foci $F_1$, $F_2$ and $F_3$, respectively, and the image field diaphragms $B_1$, $B_2$ and $B_3$, respectively. The positions of the exit pupils of the three constructional examples are indicated by the pupil centres $P_1$, $P_2$ and $P_3$, respectively. $r$ designates the radii and $d$ the thicknesses of the lenses. $D$ signifies the free diameters of the image-field diaphragms and $l$ the distances. The kinds of glass used are determined by the respective refractive indices $n_D$ for the D-line of the solar spectrum and by the Abbe conditions $\nu$.

The following Table 1 shows the kinds of glass, the Table 2 the diameters D of the image-field diaphragms, the Table 3 the distances $l$ and thicknesses $d$, and the Table 4 the radii of curvature $r$ of the three constructional examples.

Table 1

|  | $n_D$ | $\nu$ |
|---|---|---|
| Lenses I, VII, XIII | 1.7174 | 29.5 |
| Lenses II, III, IV, V, VI, VIII, IX, XI, XII, XIV | 1.5163 | 64.0 |
| Lens X | 1.6477 | 33.9 |

Table 2

$D_1 = 108$
$D_2 = 115$
$D_3 = 125$

Table 3

| | |
|---|---|
| $l_1=55.0$ | $l_7=0.6$ |
| $d_1=6.7$ | $d_8=23.0$ |
| $d_2=43.3$ | $l_8=67.0$ |
| $l_2=1.4$ | $l_9=20.0$ |
| $d_3=16.7$ | $d_9=37.9$ |
| $l_3=1.4$ | $d_{10}=6.3$ |
| $d_4=16.7$ | $d_{11}=52.0$ |
| $l_4=92.0$ | $l_{10}=0.6$ |
| $l_5=68.0$ | $d_{12}=36.3$ |
| $d_5=30.0$ | $d_{13}=6.3$ |
| $l_6=0.6$ | $l_{11}=0.6$ |
| $d_6=40.0$ | $d_{14}=22.2$ |
| $d_7=6.7$ | $l_{12}=69.0$ |

Table 4

| | | |
|---|---|---|
| $r_1=-472$ | $r_9=-140$ | $r_{17}=+121.5$ |
| $r_2=+120$ | $r_{10}=+183$ | $r_{18}=-151$ |
| $r_3=-120$ | $r_{11}=-114$ | $r_{19}=+200$ |
| $r_4=+190$ | $r_{12}=-1450$ | $r_{20}=-174$ |
| $r_5=-447$ | $r_{13}=+101$ | $r_{21}=-326$ |
| $r_6=+112$ | $r_{14}=\infty$ | $r_{22}=+93$ |
| $r_7=+1000$ | $r_{15}=+367$ | $r_{23}=+460$ |
| $r_8=+740$ | $r_{16}=-121.5$ | |

I claim:

1. An optical system for telescope eyepieces, comprising a front, a medial and a rear element, said elements being convergent and axially spaced by air, the sum of the distances apart of said elements being at most one-third of the focal length of said system, said rear element being a single lens, the numerical value of the curvature of the rear surface of said lens being smaller than the numerical value of the refractive power of said lens, said medial element consisting of at least one lens and at most two lenses, said front element consisting of at least one lens, the front lens of said medial element and that lens of said front element which faces this front lens of said medial element being convergent, at least one optically effective surface of one of said two convergent lenses being a cemented surface, the refractive power of one cemented surface of said two convergent lenses amounting to at least eleven twentieths of the algebraic sum of the refractive powers of all cemented surfaces of said convergent lenses, the numerical value of last said sum being greater than one-twelfth of the sum of the numerical values of the curvatures of those surfaces of said convergent lenses which face each other.

2. In an optical system according to claim 1, said medial element consisting of two cemented lenses.

3. An optical system for telescope eyepieces comprising a front, a medial and a rear element, said elements being convergent and axially spaced by air, the sum of the distances apart of said elements being at most one-third of the focal length of said system, said rear element being a single lens, the numerical value of the curvature of the rear surface of said lens being smaller than the numerical value of the refractive power of said lens, said medial element consisting of at least one lens and at most two lenses, the rear surface of said medial element being convex, said front element consisting of at least one lens, the front lens of said medial element and that lens of said front element which faces this front lens of said medial element being convergent, at least one optically effective surface of one of said two convergent lenses being a cemented surface, the refractive power of one cemented surface of said two convergent lenses amounting to at least eleven-twentieths of the algebraic sum of the refractive powers of all cemented surfaces of said convergent lenses, the numerical value of last said sum being greater than one-twelfth of the sum of the numerical values of the curvatures of those surfaces of said convergent lenses which face each other.

4. In an optical system according to claim 3, the refractive power of said convex surface of said medial element being at most half as great as the refractive power of said medial element.

5. An optical system for telescope eyepieces, comprising a front, a medial and a rear element, said elements being convergent and axially spaced by air, the sum of the distances apart of said elements being at most one-third of the focal length of said system, said rear element being a single lens, the numerical value of the curvature of the rear surface of said lens being smaller than the numerical value of the refractive power of said lens, said medial element consisting of at least one lens and at most two lenses, said front element consisting of three lenses, said three lenses being cemented to each other, the front lens of said medial element and that lens of said front element which faces this front lens of said medial element being convergent, at least one optically effective surface of one of said two convergent lenses being a cemented surface, the refractive power of one cemented surface of said two convergent lenses amounting to at least eleven twentieths of the algebraic sum of the refractive powers of all cemented surfaces of said convergent lenses, the numerical value of last said sum being greater than one twelfth of the sum of the numerical values of the curvatures of those surfaces of said convergent lenses which face each other.

6. In an optical system according to claim 5, the medial lens of said front element being divergent.

7. An optical system for telescope eyepieces, comprising a front, a medial and a rear element, said elements being convergent and axially spaced by air, the sum of the distances apart of said elements being at most one-third of the focal length of said system, said rear element being a single lens, the numerical value of the curvature of the rear surface of said lens being smaller than the numerical value of the refractive power of said lens, said medial element consisting of at least one lens and at most two lenses, said front element being a single lens, the front lens of said medial element and that lens of said front element which faces this front lens of said medial element being convergent, at least one optically effective surface of one of said two convergent lenses being a cemented surface, the refractive power of one cemented surface of said two convergent lenses amounting to at least eleven-twentieths of the algebraic sum of the refractive powers of all cemented surfaces of said convergent lenses, the numerical value of last said sum being greater than one-twelfth of the sum of the numerical values of the curvatures of those surfaces of said convergent lenses which face each other.

8. In an optical system according to claim 7, the refractive power of the front surface of said front element amounting to at most one-quarter of the refractive power of said optical system.

ALBERT KÖNIG.